Dec. 1, 1936. A. O. AUSTIN 2,062,283
COMPENSATED TRUNNION TYPE CLAMP
Filed Nov. 29, 1933 3 Sheets-Sheet 1

INVENTOR
Arthur O. Austin

Dec. 1, 1936. A. O. AUSTIN 2,062,283
COMPENSATED TRUNNION TYPE CLAMP
Filed Nov. 29, 1933 3 Sheets-Sheet 2
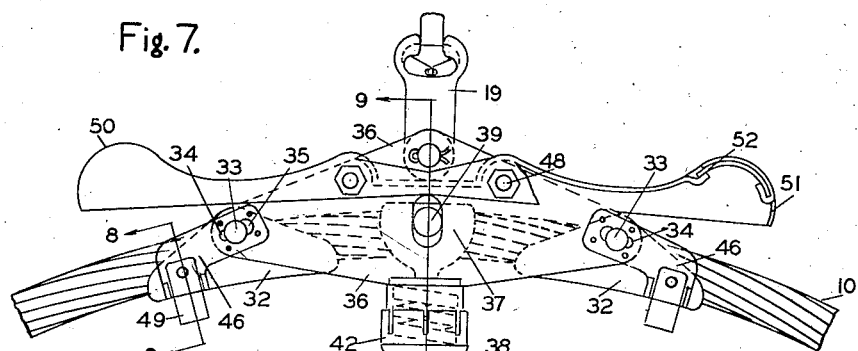
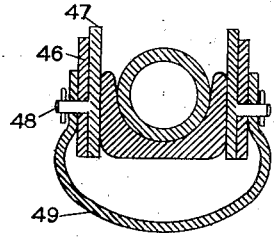
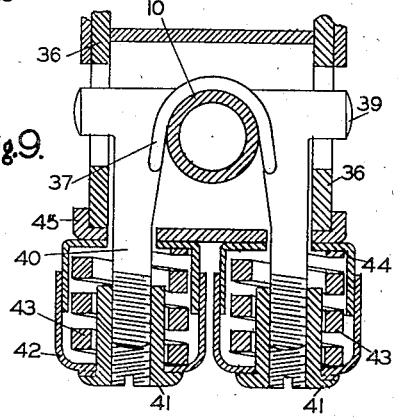
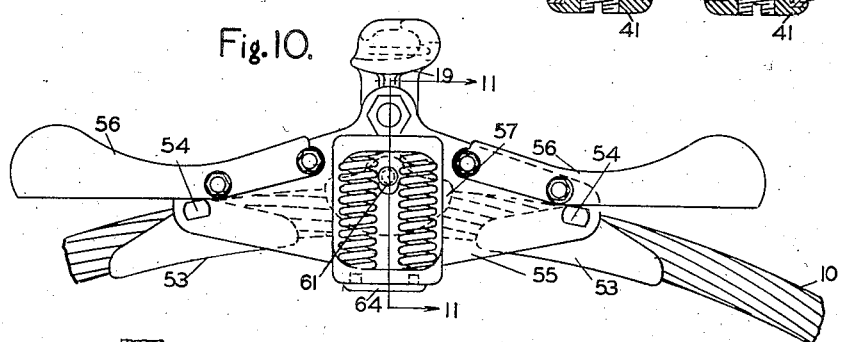
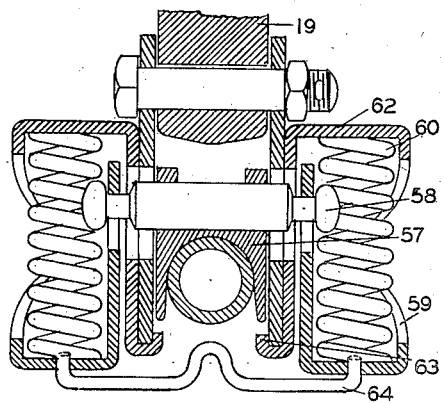
INVENTOR
Arthur O. Austin $R+H = y \operatorname{cosec} x$
$\operatorname{arc} = (2x/180)\pi R$ $R_a = H_2 + Z \operatorname{cosec} x_2$
$.5 \operatorname{ARC} = (x/180)\pi R$ $R+H = y \operatorname{cosec} x_1$
$R = y \operatorname{cosec} x - H$
$.5 \operatorname{ARC} = (x/180)\pi R$ INVENTOR
Arthur O. Austin Patented Dec. 1, 1936

2,062,283

UNITED STATES PATENT OFFICE 2,062,283

COMPENSATED TRUNNION TYPE CLAMP

Arthur O. Austin, near Barberton, Ohio

Application November 29, 1933, Serial No. 700,271

2 Claims. (Cl. 248—63)

This invention relates to improvements in clamps for attaching high voltage conductors to insulator strings.

The invention has for one of its objects the provision of a clamp which will permit of a long radius at the point of support.

A further object is to provide a clamp which will permit of a wide range in the angle of sag.

A further object is to provide means whereby the energy of oscillation will be absorbed in order to limit the amplitude and damage from vibration.

Another object is to provide a clamp in which the grip may be readily changed.

Another object is to provide a clamp in which clamping or gripping of the conductor may be reduced to a minimum without endangering the conductor from chafing or pounding.

Another object is to provide a clamp of efficient electrical design and which is easily manufactured.

The invention is exemplified by the combination and arrangement of parts shown in the accompanying drawings and described in the following specifications, and it is more particularly pointed out in the appended claims.

Fig. 7 is a side elevation of another form of the invention.

Fig. 8 is an enlarged section on line 8—8 of Fig. 7.

Fig. 9 is an enlarged section on line 9—9 of Fig. 7.

Fig. 10 is an elevation of another form of the invention.

Fig. 11 is an enlarged section on line 11—11 of Fig. 10.

Figure 1:
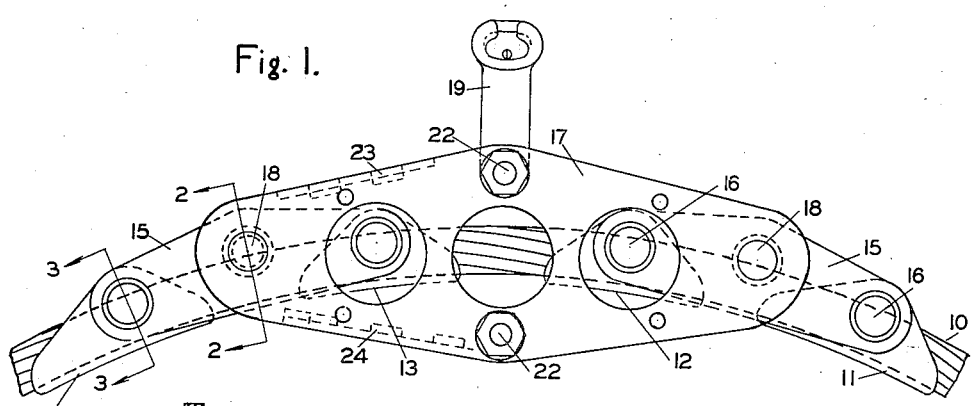
Fig. 1 is a side elevation of a clamp showing one form of the invention.

The mechanical characteristics of clamps used for attaching high tension conductors to insulator strings have much to do with the strength of supporting structures, insulators and other factors affecting the cost of the line. This is particularly true where the conductors are large and have high mechanical strength. In very high voltage lines the conductors are of large diameter in order to prevent corona losses, and frequently conductors having hollow cores or made of light construction are used in order to reduce the cost.

In order to reduce the number of supports, comparatively high stringing tensions are used. With higher stringing tensions and light construction there is a tendency for conductors to vibrate under certain wind conditions. The vibration may cause crystallization and serious damage to the conductor, clamps or insulators. Gripping the conductor tightly at a suspension clamp tends to concentrate the stress in the conductor and may cause crystallization and the ultimate failure of the conductor.

Where the grip of the conductor can be controlled or limited to low values, the danger of concentrating or setting up a maximum stress in the conductor is reduced. It is also possible to use a lighter supporting structure and an insulator string of better design for electrical properties and longer life.

In many cases the weight of the conductor in the seat of the clamp will be sufficient to maintain a good working condition. However, should the conductor vibrate or the downward component be rather small in the seat of the clamp due to a very small sag or possible uplift, serious damage may result due to the conductor rubbing or beating against the seat of the clamp. For the above reasons it is generally advisable that some downward pressure be provided in addition to that provided by the weight of the conductor. This may be necessary to insure contact between conductor and the clamp seat at point of entrance to the ordinary clamp, and for the improved clamp under very severe conditions.

It is evident that a clamp having a single rigid seat which will be tangent to the incoming conductor for a large sag will not be in contact with the conductor at the point of entrance where the sag is reduced. Any vibration therefore under reduced sag will permit of the conductor to beat against the clamp seat. If the clamp seat is made with a large radius of curvature so that there will be contact between the conductor at the point of entrance for small sags or angles of entrance, the conductor will be bent at the point of entrance where the sags are greater. It is therefore seen that it is a distinct advantage to maintain contact between the clamp seat and point of entrance of the conductor for all sags and at the same time provide a clamp which will permit of a large radius of curvature for the conductor at the point of support.

In my improved clamp means are provided so that contact is maintained at the point of entrance for all working positions of the conductor and in addition the radius of curvature depends upon the sag of the conductor. Where high tensions and small sags are used the clamp automatically provides a long effective radius.

In one form of my improved type of clamp shown in Fig. 1 the conductor 10 passes thru clamp seats 11, 12, 13, and 14. The clamp seats are attached to yoke members 15 by means of trunnions 16. The yokes 15 are attached to an equalizer yoke 17 by means of trunnions 18. The yoke 17 is attached to the insulator support by an adapter 19. The conductor is allowed to rest in U shaped seat pieces, one of which is shown in section in Fig. 3.

Figure 2:
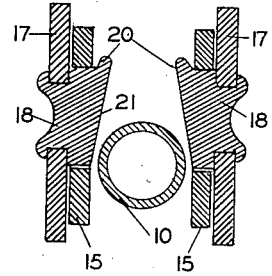
Fig. 2 is an enlarged section on line 2—2 of Fig. 1.

The axes of the trunnions 16 are located above the axis of the conductor. The axis of the yoke 15 is also located above the axis of the conductor and is shown in Fig. 2. The equalizing yokes 15 permit of uniform bearing between conductor and seat pieces. It is evident that any downward pressure on seats 11 and 14 will tend to move the seats 12 and 13 upward. It is evident that if the trunnions 18 were located on the axis of the conductor any upward movement of the seat pieces 12 and 13 would require that the conductor slide on the seat pieces, as the cord between the trunnions 18 would remain constant and the effective radius of curvature would be reduced. If slipping of the conductor did not take place the conductor would be bent at or near the outer edge of the clamp.

Figure 12:
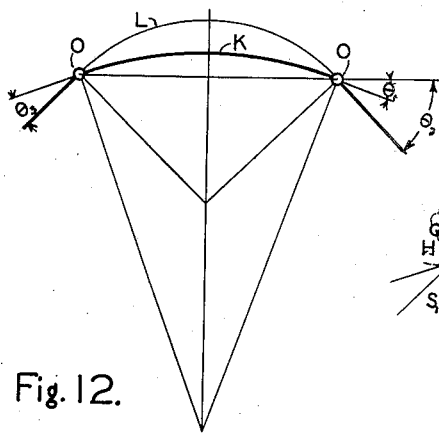
Fig. 12 is a diagram showing the undesirable bending of the conductor due to change of sag angle where the trunnion is placed on the center line of the conductor.

In my invention means are provided for shortening the cord between the trunnions or points of rotation so that the bending and movement of the conductor in the seats will be reduced to a minimum. The method adopted for producing the desired results is shown by reference to Fig. 12 and Fig. 13. In Fig. 12 the initial position of the conductor is shown at "K". The point of rotation is about the centers O—O. The conductor has an angle of sag $\theta_1$. The minimum bend for the conductor in the clamp will be provided by an arc which is tangent to the incoming conductor, making the angle $\theta_1$. If the angle of sag $\theta_1$ is increased to $\theta_2$ and the conductor is gripped tightly in the clamp seats, the length of the arc O—K—O will remain the same and the conductor will be bent thru an angle of $\theta_2$ at the point of rotation "O". For minimum bending the axis of the conductor should be tangent to the conductor as it leaves the clamp. This would require that the conductor take the path O—L—O between the points of support in the yoke. It is evident that the conductor necessarily would have to slip in the clamps to provide for the increased length of arc of O—L—O/O—K—O.

It is evident that if the conductor is initially installed along the line O—L—O and the sag angle is reduced, a bend in the opposite direction will result.

It is evident from a consideration of Fig. 12 that supporting the conductor by seat pieces in which the axis of rotation is on the center line of the conductor is open to serious objections particularly where the conductors are large or where it is desired to develop the strength or life in the conductor.

Figure 13:
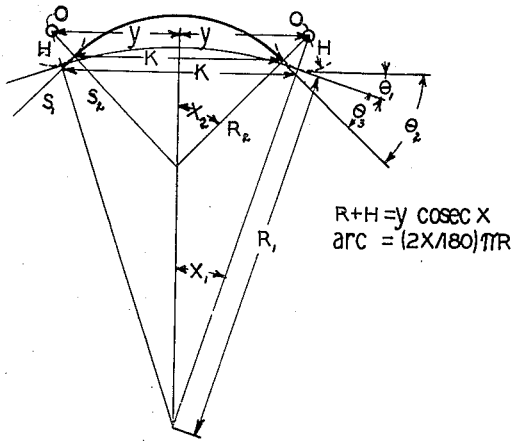
Fig. 13 is a diagram showing the principle of the invention where both sides of the clamp are symmetrical.

The general method of operation of the invention for compensating for the constant length of conductor in the arc is shown in Fig. 13. In Fig. 13 the trunnions or points of rotation "O" are above the axis of the conductor $S_1$. The distance between the axis of the conductor and the point "O" is shown as "H". For the sag angle $\theta_1$ the radius $R_1$ for an arc tangent to the incoming conductor will be normal to the conductor and pass thru the center of rotation of the seat "O". The length of the radius $R_1$ may be found by determining the point of intersection with the center line of the clamp.

If the angle of sag increases from $\theta_1$ to $\theta_2$ the conductor will move thru an angle of $\theta_3$. A normal to the new angle of sag is shown by $R_2$. It is evident that since the point $S_1$ is below the point of rotation "O", an increase in the sag angle will cause the point $S_1$ to move to point $S_2$. This will shorten the cord for the arc formed by the conductor inside the seat pieces. It is also evident that the change in the length of cord will depend upon the distance "H" of the axis of rotation of the seat pieces above the axis of the conductor and upon the change in angle.

By substituting various values of "H" for a given distance between centers of rotation, a relation of parts is readily determined in which the arc between seat pieces is approximately tangent to the incoming conductor over a wide range in the change in the angle of sag. This arrangement provides the maximum radius for an arc tangent to the incoming conductor.

It is evident that the method of compensation applies to two spaced points on a yoke such as the trunnion 16 and the yoke 15. It is also apparent that the yoke 15 with the seat pieces 11 and 12 may be regarded as a single clamping member, in which case the location of the trunnions 18 would be at O—O and the distance between the axis of these trunnions to the axis of the conductor would depend upon the distance between centers and the range of sag angle. In this way a change in radius in passing thru the seat pieces 11 and 12 would not occasion slipping, likewise the proper location of the trunnions 18 would prevent any tendency of the conductor to slip between the two systems supported by the equalizer yokes 15.

It is evident that the principle of compensating for the fixed length of arc in order to provide maximum radius of bend and eliminate the tendency to slip by changing the effective length of the cord can be accomplished by placing the points of rotation above the axis of the conductor as in Fig. 13 or by placing point of rotation of the seat on one side of the clamp above the axis of the conductor and the axis of rotation of the seat on the other conductor below the axis of the conductor.

Figure 14:
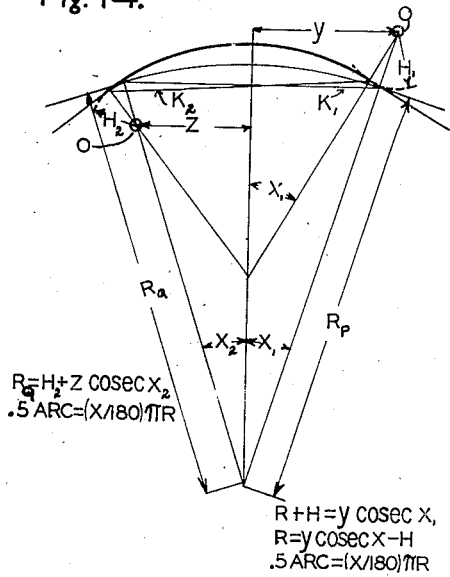
Fig. 14 is a diagram showing the principle of the invention applied to a clamp where the axis of rotation of one seat is above the center line of the conductor and the axis of the other seat is below the conductor.

The distance $H_1$ in Fig. 14 is made enough larger than $H_2$ so that the proper relation of cord length to arc length will be maintained for the various sag angles.

Figure 15:
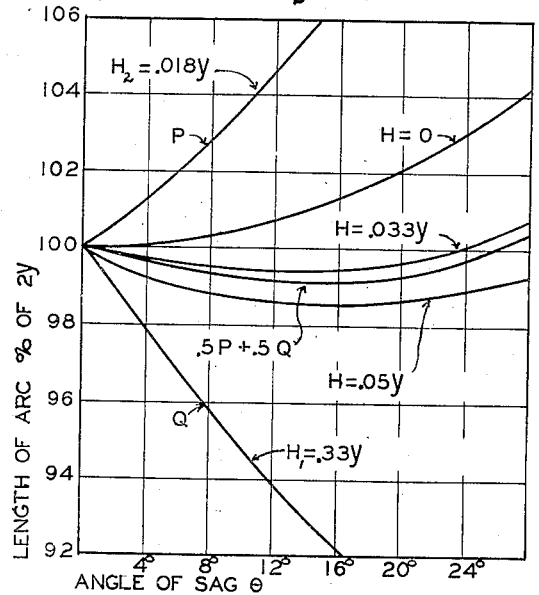
Fig. 15 is a graph showing the application of the invention.

In Fig. 15 the theoretical length of arc for various angles of sag is shown to provide maximum radius of bend for several different ratios of H to Y or distance of point of rotation from center line of yoke. It is not essential that the cord be changed so that the length of conductor in the arc tangent be constant from a zero sag angle but only over the working range of sag angle. Regardless of whether or not the conductor is properly installed, the use of the offset or compensating trunnion will reduce the bend in the conductor due to vibration and changes in sag angle to a minimum. The sag angle up to the normal to the radius "R" only is given. The full sag angle will be greater and will depend upon the length and shape of the clamp seat.

With the arrangement it is not necessary to grip the members tightly to prevent slipping and abrasion of the conductor as the use of a proper offset distance will permit of a wide change in the angle of sag due to changes in temperature or vibration without causing the conductor to slip. This is a material advantage as grip members at the point of entry can be entirely eliminated if desired. It is also possible to extend the seat piece each side of the trunnion as the concentrated bend will not take place on either side of the grip member as in the case where the axis of the trunnion is on the center line of the conductor.

Figure 3:
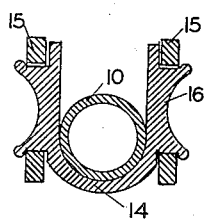
Fig. 3 is an enlarged section on line 3—3 of Fig. 1.

In Fig. 1 the yoke members 15 are attached to the seat pieces by trunnions 16, the arrangement being shown in Fig. 3. The trunnions 16 preferably are formed so as to hold the yoke members 15 and the two seat pieces together. This permits of ready assembly as the yoke members 15 and seat pieces may be raised up against the conductor. The main yoke members 17 are provided with trunnions 18 which preferably are fastened tightly to the members as shown in Fig. 2.

The inner end of each trunnion 18 is provided with a lip or projection 20 and a beveled inner face 21. The arrangement permits of the side pieces with the trunnions 18 being slipped thru holes in the small yoke members 15. The main yoke members are then held together with bolts 22 which clamp the two main plates together. Meshing tongues or projections 23 and 24 may be provided on the two halves so that they will be interlocked, although this is not necessary. It is evident that where the plates 17 forming the main yoke are drawn together, these members will rub upon the small yoke plates 15 and cause frictional losses during any relative rotation between the members 15 and 17. This will tend to dampen out oscillations or vibrations.

The conductor 10 may be in any form such as a segmental tubular form of conductor, a conductor made up of hollow or structural members, or one with a reinforced core. The clamp is particularly applicable to use with aluminum steel reinforced conductors as the bearing between the high strength steel core and outer conducting layer may be distributed over a large distance and the angle of bend materially reduced. By making the trunnions of large diameter the rotation of the seat pieces or yokes with respect to each other will cause an appreciable movement and dissipation of energy, tending to dampen out or reduce oscillations or vibrations. Such an arrangement is shown in Figs. 1, 2 and 3. The construction also permits of the use of non-ferrous metals for the manufacture of clamps in order to provide maximum life or light weight.

Figure 4:
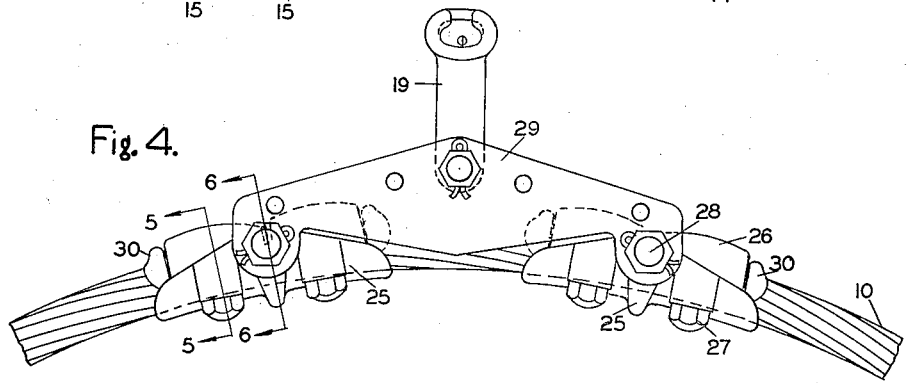
Fig. 4 is a side elevation of a modified form of the elevation.

Fig. 4 shows another form of the invention in which the seat pieces 25 are provided with clamping pieces 26 which are tightened by nuts 27. The seats are provided with trunnions 28 which are located in yoke members 29. The compensating trunnions 28 are placed sufficiently above the axis of the conductor so that the maximum radius of bend will be obtained for the conductor as it passes thru the clamp. In other words bending will be reduced to a minimum. This usually requires placing the axis of the compensating trunnions above the axis of the conductor a distance of from four to six percent of that between the trunnions on the two sides of the clamp or yoke.

Figure 5:
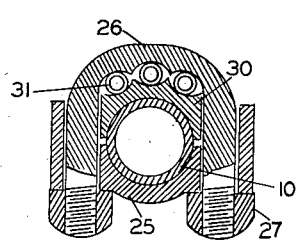
Fig. 5 is an enlarged section on line 5—5 of Fig. 4.
Figure 6:
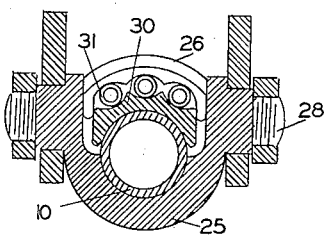
Fig. 6 is an enlarged section on line 6—6 of Fig. 4.

An improved type of clamping mechanism is provided in order to insure a grip over a wide range of conditions. High tensions or wear between the strands in a conductor tend to reduce the diameter, and reduce the grip in the clamp unless compensating resiliency is provided in the gripping mechanism. In Fig. 4 an improved type of gripping mechanism is provided which not only will distribute the bearing over the conductor but will permit of a heavy grip with considerable resiliency. The conductor rests in the main seats 25 and a gripping seat or saddle 30 bears directly upon the conductor. The caps or clamping members 26 bear upon helical or tubular spring members 31, the general arrangement of parts being shown in Figs. 5 and 6. A construction showing spring rollers in a clamp is shown in my prior application Serial No. 682,447 filed July 27, 1933. This construction differs from the prior case in that there is no wedging rollers in the present application but the springs are used for maintaining uniform pressure of the gripping member 30. In Fig. 4 the seat pieces 26 are made in two parts and are tightened by the nuts 27. It is evident that the resilient gripping scheme may be modified in various ways. The resilient members may be made up with several concentric members, the inner ones preventing collapse of the outer ones even though an abnormal tightening is used.

Fig. 7 shows another form of the invention in which the seat pieces 32 are supported by trunnions 33. The trunnions 33 are provided with projection 34. The projection 34 is passed thru an elongated opening 35 in the yoke members 36. The seat pieces when rotated in position will be locked as the projections 34 will prevent disengagement from the yoke pieces until the seat pieces are rotated approximately 180°. The offset compensating trunnions are used similar to those in Fig. 1 and Fig. 4. However, the seat pieces are not provided with gripping or clamping members. Additional downward pressure is provided by a hold-down seat 37 which is held down by a spring system 38. The seat or saddle 37 is provided with lugs or projections 39, the general arrangement of parts being shown in Fig. 9 in which the member 37 is shown in elevation.

The saddle 37 is provided with bolts 40 and nuts 41. The nuts 41 with housing 42 bear against springs 43. When tightened the springs pull downward on the bolts 40 which in turn cause the saddle to bear upon the upper side of the conductor. The shields 42 preferably are made so that they will bear against the complementary shields 44. Any movement of the conductor 10 and saddle 37 will produce vertical movement of the shield 42, which is held tightly against the nuts by the springs 43. By slotting or otherwise producing resiliency in the shield 42 a fairly definite pressure may be maintained between the two parts of the shield 42 and 44. Any movement therefore will produce friction losses and tend to dampen out or reduce vibrations or oscillations. It is evident that the pressure exerted by the saddle may be increased by tightening the nuts 41 or by using stiff springs, or in some cases if desired the springs may be eliminated entirely, the nuts bearing directly against the plate 45.

The projecting pins 39 prevent any longitudinal movement of the saddle even if the conductor is allowed to slip thru the clamp during installation or during operation. It is evident that the saddle makes it possible to increase the pressure between conductor and seat pieces. Any downward pressure exerted by the seat piece will tend to bear down on the inner end of the seats 32 which in turn will tend to raise the outer ends, making the seat pieces press more tightly against the conductor at the point of entry.

Additional damping means for absorbing the energy produced by vibrations or oscillations may be readily provided with this type of clamp by increasing the yoke members to bear against the seat pieces or by other means, as the seat pieces may be given a relatively long bearing upon the conductor so that there will be little tendency to bend at the point of entry.

Fig. 8 shows one method of increasing frictional losses. The plate members 46 are attached to the main yoke members 36 or may be made as an extension of the yoke members. Friction shoes 47 are provided with pins 48 which pass thru the members 46. The plates 47 bear directly against the seats 32 which are equipped with a friction or wearing boss. The pressure exerted by the members 46 upon the plates 47 cause frictional losses and a dissipation of energy due to any relative movement between the clamp seat and the member 46 with its wearing shoe 47. The pressure may be supplied entirely by the member 46 thru the clamping bolts 48 or thru a spring member 49, the general arrangement being shown in Fig. 8.

In order to reduce the possibility of corona losses and to provide arc protection for the conductor, shields 50 are provided. These shields may be readily made by stamping or casting, and provide spacing means for the yoke plates 36. The bolts 48 which hold the yoke pieces also attach the shields 50. The shields are provided with rounded ends in order to reduce corona losses. A slot 51 provides increased clearance for the conductor for slight angles of sag and at the same time permits placing the shield closely to the conductor in order that a smaller size may be used and still avoid corona or brush discharge. Reinforcing member 52 is shown to prevent arc destruction or to catch burning metal in case light fusible alloys are used.

Fig. 10 shows another modification in which the seat pieces 53 are provided with offset locking trunnions 54. The yoke members 55 are equipped with shields 56 which hold the upper portion of the yoke firmly together. A saddle 57 somewhat similar to that in Fig. 7 bears upon the conductor. The pressure upon the saddle is exerted thru a pin 58 and a housing 59. Springs 60 bear against the housing 59 and force it downward against the pin 58, which passes thru a locking hole 61. The upper ends of the spring bear against a housing 62 which is provided with a turned up lip 63, which in turn engages the lower edge of the yoke members 55. It is readily seen that the action of the springs maintains the proper assembly of the various parts. The pressure of the springs upon the seat pieces 59 will tend to rotate them inwardly, causing these members to bear against the housing 62. Under this arrangement any vertical movement would produce frictional losses and a dampening effect upon oscillations or vibrations. This loss may be controlled by changing the springs or the location so that the pressure between the two parts of the housing will be affected.

Another method is to use an auxiliary member 64. This member may be used to relieve the frictional losses entirely by holding the members free as shown in Fig. 11. If this member is removed the action of the springs upon the shields 59 will produce friction losses. If the member 64 is of such dimension that it will draw the shields 59 inwardly and increase the pressure, the frictional losses will be increased for a given movement. It is readily seen with the type of clamp shown that the wear of the parts will not cause play and reduce the effectiveness of the frictional losses.

The compensating offset trunnion permits of the design and operation of clamps more favorable to the conductor and upon a more efficient basis. Any tendency to cause rotation of the seat pieces due to the offset trunnions may be sufficiently compensated for wherever necessary by changing the relative length of the seat in the clamps. Seat 14 of Fig. 1 with the longer end outward will tend to reduce the pressure at the point of entry and will reduce the tendency for the outer end to move upwardly in case of an unbalanced load exerted outwardly by the conductor upon the seat. In the case of seat 11 the shorter end of the seat is thrown outwardly, which will tend to increase the relative pressure between the conductor and clamp seat at point of entry.

The compensating offset trunnion makes it possible effectively to use a number of seat pieces and still obtain full benefit from them either as a gripping means or for increasing the effective radius of curvature at the point of support. The invention also makes it possible to use clamps without grip members in order to limit the grip and the duty upon insulators and structures. This permits of material economy as light structures may be used with very strong conductors for a major portion of the transmission system. Occasionally heavy towers may be used and the grip increased at these points by changing the design of the clamp or by increasing the grip by one of the several methods shown.

It is also evident with the offset trunnion that multiple seats may be used effectively for increasing the grip even though the angle of sag may change materially. Without this compensation it is difficult to distribute the load between two or more seats over any appreciable range in angle of sag unless the conductor slips materially in one of the seats. The compensating offset trunnion eliminates any necessity for slots or compensating links where two or more seats are used, hence proper division of load and stress may be maintained. The seat pieces of Fig. 1 may all be provided with grip members as in Fig. 4 or by a system as shown in Fig. 7.

The use of a yoke eliminates any direct line pull upon the insulator or support, therefore oscillations may pass with reduced reflection. The large radius or curvature, dampening of vibrations, and maintenance of contact between conductor and clamp seats tend to produce favorable conditions for the conductor and permit the use of improved clamp construction and materials.

I claim:
1. The combination with a cable of a seat for supporting said cable, a contact member for engaging said cable in said seat, a clamp for press- ing said contact member against said cable fixed resilient means interposed between said clamp and contact member and threaded means for pressing said clamp against said resilient means.

2. A support for a cable comprising a pair of laterally spaced rigidly connected yoke members, means for pivotally supporting said yoke members, a pair of cable seats pivotally mounted between said yoke members the pivotal axes of said seats being spaced from each other longitudinally of said yoke members, a pair of co-axial trunnions for each of said seats, one trunnion engaging each of said yoke members, said trunnions being spaced apart longitudinally of their common axis to provide clearance for a cable, the axis of said trunnions being transverse to the axis of said cable and spaced vertically therefrom so as to bring points on said cable adjacent said respective seats closer together when said seats rotate on their pivotal axes to decrease the radius of curvature of the portion of the cable between said points.

ARTHUR O. AUSTIN.